United States Patent
Mito et al.

(10) Patent No.: US 11,072,308 B2
(45) Date of Patent: Jul. 27, 2021

(54) SEAT STRUCTURE FOR VEHICLE

(71) Applicant: MAZDA MOTOR CORPORATION, Hiroshima (JP)

(72) Inventors: Saori Mito, Hiroshima (JP); Yoshiyuki Iwamoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 8 days.

(21) Appl. No.: 16/690,532

(22) Filed: Nov. 21, 2019

(65) Prior Publication Data
US 2020/0164832 A1    May 28, 2020

(30) Foreign Application Priority Data

Nov. 27, 2018 (JP) .............................. JP2018-220861
Aug. 6, 2019 (JP) .............................. JP2019-144878

(51) Int. Cl.
*B60N 2/06* (2006.01)
*B60N 2/07* (2006.01)
*B60R 22/20* (2006.01)
*B60R 22/26* (2006.01)

(52) U.S. Cl.
CPC .............. *B60R 22/201* (2013.01); *B60N 2/06* (2013.01); *B60R 22/26* (2013.01); *B60N 2/0705* (2013.01); *B60R 2022/263* (2013.01)

(58) Field of Classification Search
CPC ...... B60N 2/06; B60N 2/0705; B60N 2/0715; B60N 2/07; B60N 2/0722; B60R 22/18; B60R 22/201; B60R 22/26; B60R 2022/263
See application file for complete search history.

(56) References Cited

U.S. PATENT DOCUMENTS

| | | | | |
|---|---|---|---|---|
| 4,818,022 A | * | 4/1989 | Nishimura | B60N 2/06 280/804 |
| 7,384,103 B2 | * | 6/2008 | Rausch | B60N 2/0705 297/468 |
| 9,027,993 B2 | * | 5/2015 | Munemura | B60N 2/3065 297/216.1 |
| 9,718,386 B2 | * | 8/2017 | Hayashi | B60N 2/0715 |

(Continued)

FOREIGN PATENT DOCUMENTS

| FR | 2988665 A1 * 10/2013 | ........... B60N 2/0732 |
|---|---|---|
| JP | 2008-049893 A   3/2008 | |

(Continued)

*Primary Examiner* — Ryan D Kwiecinski
(74) *Attorney, Agent, or Firm* — Studebaker & Brackett PC

(57) ABSTRACT

A seat structure for a vehicle comprises a seat, a seat rail comprising a lower rail and an upper rail, and an anchor bracket fixing an anchor (a first anchor) of a seatbelt device to the upper rail. The anchor bracket includes a first bracket provided with a first bottom portion fixed to the upper rail and a first side portion rising upwardly from the first bottom portion and a second bracket provided with a second bottom portion fixed to the upper rail, a second side portion rising upwardly from the second bottom portion, and an anchor attachment portion where the anchor is attached. The first side portion and the second side portion are joined together, overlapping each other in a vehicle width direction, and the first bracket extends forwardly beyond the second bracket.

11 Claims, 7 Drawing Sheets

(56) References Cited

U.S. PATENT DOCUMENTS

| | | | |
|---|---|---|---|
| 10,723,309 B2 * | 7/2020 | Ohno | B60N 2/0732 |
| 2008/0048086 A1 * | 2/2008 | Kojima | B60R 22/26 |
| | | | 248/429 |
| 2009/0167073 A1 * | 7/2009 | Fujieda | B60N 2/0705 |
| | | | 297/452.18 |

FOREIGN PATENT DOCUMENTS

| | | | | |
|---|---|---|---|---|
| WO | WO-2011118314 A1 * | 9/2011 | | B60N 2/0715 |
| WO | WO-2014045423 A1 * | 3/2014 | | B60N 2/1615 |

* cited by examiner

SEAT STRUCTURE FOR VEHICLE

BACKGROUND OF THE INVENTION

The present invention relates to a seat structure for a vehicle.

Japanese Patent Laid-Open Publication No. 2008-49893 (its counterpart US Patent Application Publication No. 2008/0048086 A1) discloses a seat slide device for a vehicle, which is configured to move a seat longitudinally. This seat slide device for the vehicle comprises a lower rail and an upper rail. An anchor bracket to fix an anchor of a seatbelt device is attached to the upper rail. Herein, when the seat moves longitudinally, the anchor bracket moves longitudinally together with the seat.

The above-described seat slide device for the vehicle is configured such that when an occupant is restrained in a case where a collision load is applied to the vehicle in a vehicle collision, for example, an upward load and a load in a vehicle width direction are applied to the anchor, and these loads are received by the anchor bracket, the upper rail, and the lower rail. Thereby, the above-described seat slide device for the vehicle is configured to provide sufficient resistance against the upward load and the load in the vehicle width direction.

Herein, the anchor bracket is arranged in a narrow space beside the seat together with other seat structural members. Therefore, even if the anchor bracket disclosed in the above-described patent document needs to be large sized for further improvement of the above-described resistance provision, it may be difficult that its enlargement is attained without interfering with the other members.

Moreover, if a plate thickness of the anchor bracket is increased for improvement of the load resistance performance, an improper weight increase of the anchor bracket may be caused.

SUMMARY OF THE INVENTION

An object of the present invention is to provide a seat structure for a vehicle which can properly provide the sufficient resistance against the loads applied to the anchor bracket without improper enlargement of the anchor bracket.

The present invention is a seat structure for a vehicle, comprising a seat where an occupant is seated, a seat rail fixed to a vehicle body, the seat rail comprising a lower rail including a groove portion extending in a vehicle longitudinal direction and an upper rail provided to be slid in the groove portion of the lower rail and guided by the lower rail, and an anchor bracket fixing an anchor of a seatbelt device for restraining the occupant to the upper rail of the seat rail, wherein the anchor bracket includes a first bracket provided with a first bottom portion fixed to the upper rail and a first side portion rising upwardly from the first bottom portion and a second bracket provided with a second bottom portion fixed to the upper rail, a second side portion rising upwardly from the second bottom portion, and an anchor attachment portion where the anchor is attached, the first side portion of the first bracket and the second side portion of the second bracket are joined together so as to overlap each other in a vehicle width direction, and the first bracket is provided to extend forwardly beyond the second bracket at an upper surface of the upper rail of the seat rail.

According to the present invention, the anchor of the seatbelt device is fixed to the upper rail of the seat rail via the anchor bracket. As the seat slides in a longitudinal direction, the anchor bracket and the anchor slide in the longitudinal direction as well. The anchor is located at an appropriate position which corresponds to the seat, so that the restraint performance of the occupant is improved. The seatbelt device can restrain the occupant properly regardless of a body size.

The anchor is attached to the second bracket constituting the anchor bracket. The second bracket is fixed to the upper rail at its second bottom portion.

The second bracket is provided with the second side portion rising upwardly from the second bottom portion. The second side portion overlaps the first side portion of the first bracket in the vehicle width direction. The first side portion and the second side portion are joined together. The load applied to the anchor when the occupant is restrained is transmitted to the first bracket through the second bracket.

The first bracket is fixed to the upper rail at its bottom portion. The first bracket receives the load transmitted from the second bracket.

The anchor bracket is formed by two members of the first bracket and the second bracket. Since the first bracket and the second bracket are different (separated) members from each other, the plate thickness of the first bracket and the plate thickness of the second bracket can be differentiated. The load applied to the anchor is directly inputted (applied) to the second bracket. The second bracket can resist the larger load by increasing the plate thickness of the second bracket. The plate thickness of the first bracket may be thinner than that of the second bracket. The weight of the anchor bracket is reduced by making the plate thickness of the first bracket thinner. The anchor bracket comprising the first bracket and the second bracket improves the load resistance performance without any improper weight increase.

Further, the first side portion of the first bracket and the second side portion of the second bracket are joined together so as to overlap each other in the vehicle width direction. According to this structure, the load applied to the first bracket from the second bracket is a shearing load. The first bracket and the second bracket which are joined together at their side faces show enhanced resistance against the shearing load. Accordingly, the anchor bracket can provide the high load-resistance performance.

Moreover, the second bracket receives the upward load in the occupant restraint. Thereby, a moment around an axis extending in the vehicle width direction acts on the anchor bracket. Herein, the first bracket is provided to extend forwardly beyond the second bracket. The first bracket which is elongated in the longitudinal direction can properly resist the above-described moment. Thus, the anchor bracket can properly resist the moment as well.

In an embodiment of the present invention, the first bracket is longer than the second bracket in the vehicle longitudinal direction.

According to this embodiment, the second bracket receives the upward load applied to the anchor in the occupant restraint. This second bracket has a short longitudinal length (i.e., a short length in the longitudinal direction). The second bracket provides the sufficient resistance against the upward load.

Further, since the first side portion of the first bracket and the second side portion of the second bracket overlap each other in the vehicle width direction, the first bracket receives the load in the vehicle width direction which is transmitted from the second bracket.

Moreover, the first bracket has a long length in the longitudinal direction. The load in the vehicle width direction which is transmitted is dispersed at the first bracket. The first bracket can provide the sufficient resistance against the load in the vehicle width direction.

The first bracket provides the resistance against the load in the vehicle width direction primarily, and the second bracket provides the resistance against the upward load primarily. The anchor bracket can provide the sufficient resistance against the load in the vehicle width direction and the upward load which are applied to the anchor in the occupant restraint, respectively, even if its size is not so large. Thus, the restraint performance of the occupant by the seatbelt device is improved.

In another embodiment of the present invention, the first side portion of the first bracket is positioned more closely to the seat than the second side portion of the second bracket.

When the occupant is restrained, the load applied in a direction from the outside of the seat to the center of the seat is applied to the anchor through a belt webbing. According to this embodiment, since the first side portion of the first bracket is positioned more closely to the seat than the second side portion of the second bracket, the second bracket can transmit the above-described load applied in the direction from the outside of the seat to the center of the seat to the first bracket. Thus, the first bracket can provide the resistance against the load transmitted from the second bracket effectively.

In another embodiment of the present invention, a joint part of the first side portion of the first bracket to the second side portion of the second bracket is configured to have a hat-shaped cross section.

According to this embodiment, the rigidity of the joint part is increased. The first bracket can disperse the load received from the second bracket at an entire part of the first bracket. Thus, the first bracket can provide the sufficient resistance against the load.

In another embodiment of the present invention, the second bracket includes a rigidity reinforced part which is provided at a front end part of the second bottom portion.

According to this embodiment, the rigidity of the second bracket is increased. Thus, the second bracket can provide the resistance against the load effectively without its enlargement. Further, the second bracket can transmit the load to the first bracket effectively.

In another embodiment of the present invention, the second bracket is provided with a third side portion which is provided to rise upwardly from the second bottom portion and faces the second side portion, and the anchor attachment portion is provided at the third side portion.

According to this embodiment, the second bracket is configured to have a U-shaped cross section which is formed by the second bottom portion, the second side portion, and the third side portion. Thereby, the rigidity of the second bracket is increased. Thus, the second bracket can provide the resistance against the load effectively without its enlargement. Further, the second bracket can transmit the load to the first bracket effectively.

In another embodiment of the present invention, the first bracket is provided to extend over a range from a front end portion and a rear end portion of the upper rail of the seat rail.

According to this embodiment, the load transmitted from the second bracket is dispersed at the long first bracket. Thus, the first bracket can provide the resistance against the load effectively. Further, since the first bracket is provided along the rail, its interference with the other seat structural members can be avoided.

Moreover, the longitudinally-long first bracket improves the moment-resistance performance as well.

In another embodiment of the present invention, the second bottom portion of the second bracket is fixed to the upper rail of the seat rail in a state where the second bottom portion overlaps on the first bottom portion of the first bracket.

According to this embodiment, the overlapped first and second brackets can provide the resistance against the upward load effectively.

In another embodiment of the present invention, the second bracket fixed to the upper rail is provided to protrude outwardly, in the vehicle width direction, beyond the upper rail.

According to this embodiment, since the second bracket protrudes beyond the upper rail, this protrusion portion is configured in a cantilever state. In general, when the load is applied to a bracket configured in the cantilever state, it is likely that this bracket is deformed. Meanwhile, the anchor bracket of the present invention can receive the load by corporation of the first bracket and the second bracket even when the load from the anchor is applied to the second bracket configured in the cantilever state.

Herein, the arrangement position of the seat rail is decided based on a vehicle-body structure, and the size of the anchor bracket is decided by a magnitude of the load inputted and a shape and/or structure of the seat. Accordingly, there is a case where the second bracket protrudes outwardly, in the vehicle width direction, beyond the upper rail (i.e., protrudes to the outside of the seat). In this case, the anchor bracket of this embodiment can receive the load properly.

Other features, aspects, and advantages of the present invention will become apparent from the following description which refers to the accompanying drawings.

DETAILED DESCRIPTION OF THE INVENTION

Figure 1:
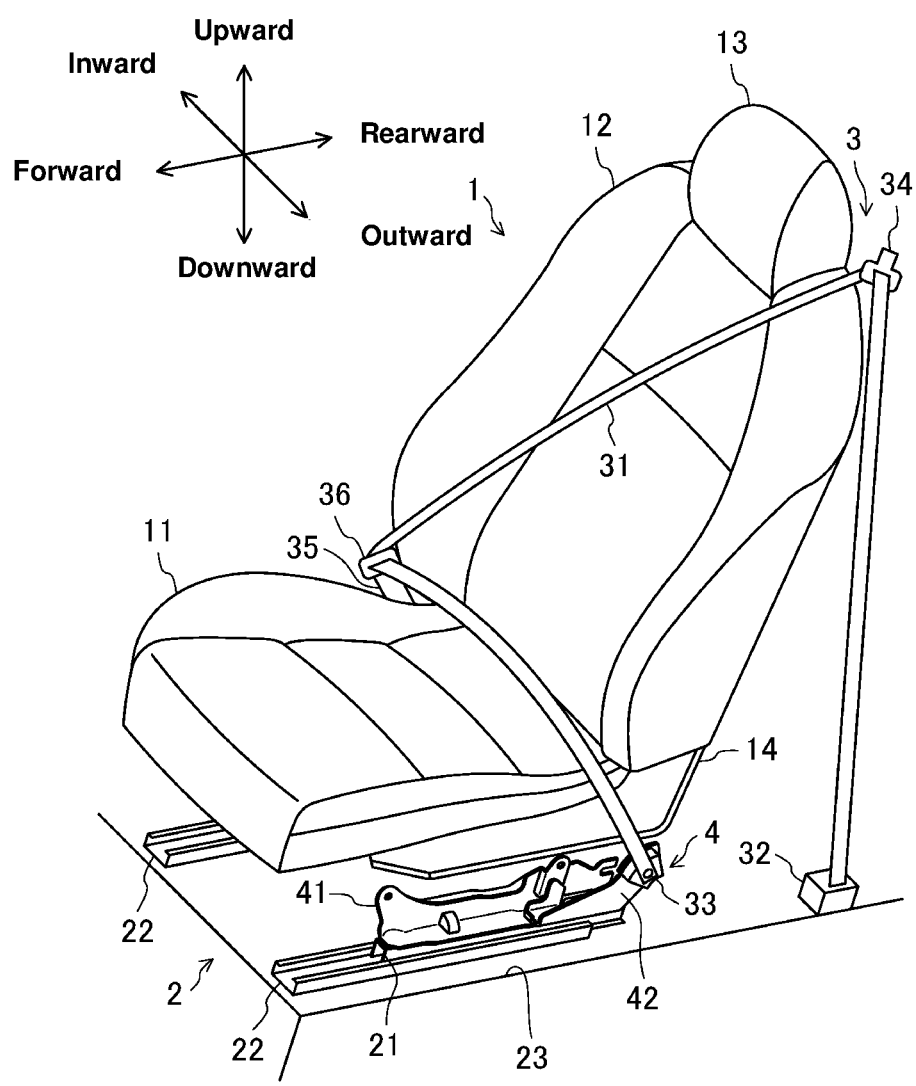
FIG. 1 is a perspective view of an exemplified seat for a vehicle.

Hereafter, an embodiment of a seat structure for a vehicle will be described referring to the drawings. The described seat structure for the vehicle is an example of an embodiment of the present invention.

FIG. 1 shows a seat 1 for the vehicle. The seat 1 is provided in a cabin of an automotive vehicle, not illustrated. In the example shown in FIG. 1, this seat 1 is a front seat. The seat 1 is disposed on the left in the cabin. In FIG. 1, the front-right side on a page is an outward side in a vehicle width direction, and the back-left side on the page is an inward side in the vehicle width direction. The seat structure for the vehicle disclosed here is applicable to a seat which is disposed on the right in the cabin as well.

The seat 1 comprises a seat cushion 11, a seatback 12, and a headrest 13. A frame 14 is installed inside the seat cushion 11. In FIG. 1, the frame 14 is illustrated so as to be exposed to outside.

Reference character 2 denotes a seat rail which slides the seat 1 in a vehicle longitudinal direction (hereafter, referred to as a "longitudinal direction" simply). This seat rail 2 is arranged below the seat 1. The seat rail 2 comprises two upper rails 21 and two lower rails 22. The two upper rails 21 are provided to be spaced apart from each other in the vehicle width direction, which is not illustrated in FIG. 1. Only one of the two upper rails 21 is illustrated in FIG. 1. Each of the upper rails 21 extends in the longitudinal direction. Each of the upper rails 21 is connected to the frame 14, which is not illustrated in FIGS. 1 and 2.

Each of the lower rails 22 extends in the longitudinal direction. Each of the lower rails 22 is fixed to a floor 23. The two lower rails 22 are provided to be spaced apart from each other in the vehicle width direction. As shown in FIGS. 5-8, each of the lower rails 22 includes a groove portion 221. The upper rail 21 and the lower rail 22 are engaged with each other. The upper rail 21 is provided to be slid along the groove portion 221 of the lower rail 22 and guided by the lower rail 22. The upper rail 21 and the lower rail 22 are movable relatively in the longitudinal direction. The seat 1 moves in the longitudinal direction together with the upper rails 21.

Reference character 3 denotes a seatbelt device, which is configured to restrain an occupant seated in the seat 1. This seatbelt device 3 is a three-point type. The seatbelt device 3 comprises a webbing 31, a retractor 32, a first anchor 33, a second anchor 34, a buckle 35, and a tongue 36.

The retractor 32 winds up the webbing 31. The first anchor 33 fixes a tip of the webbing 31 to the upper rail 21, which will be specifically described later. The first anchor 33 is positioned on the outward side, in the vehicle width direction, of the seat 1. The tip of the webbing 31 is fixed to the upper rail 21 at a position located on the outward side, in the vehicle width direction, of the seat 1. The second anchor 34 is fixed to a B pillar, not illustrated. The anchor 34 changes a direction of the webbing 31 which is drawn upwardly from the retractor 32 to the downward side. The buckle 35 is positioned on the inward side, in the vehicle width direction, of the seat 1. The buckle 35 is attached to the upper rail 21, which is not illustrated. The buckle 35 and the tongue 36 are configured to be engaged or disengaged. The tongue 36 is attached to the webbing 31 between the tip of the webbing 31 and the second anchor 34.

The occupant seated in the seat 1 pulls out the webbing 31 from the retractor 32 and engages the tongue 36 with the buckle 35, whereby the webbing 31 restrains a shoulder part and a waist part of the occupant (not illustrated here).

The first anchor 33 and the buckle 35 are respectively fixed to the upper rails 21. As the seat 1 moves in the longitudinal direction on the seat rail 2, the first anchor 33 and the buckle 35 move in the longitudinal direction as well. The first anchor 33 and the buckle 35 are located at appropriate positions which correspond to the seat 1. The webbing 31 restrains appropriate respective positions of the shoulder part and the waist part of the occupant. Thus, the seatbelt device 3 can restrain the occupant properly regardless of a body size.

Figure 2:
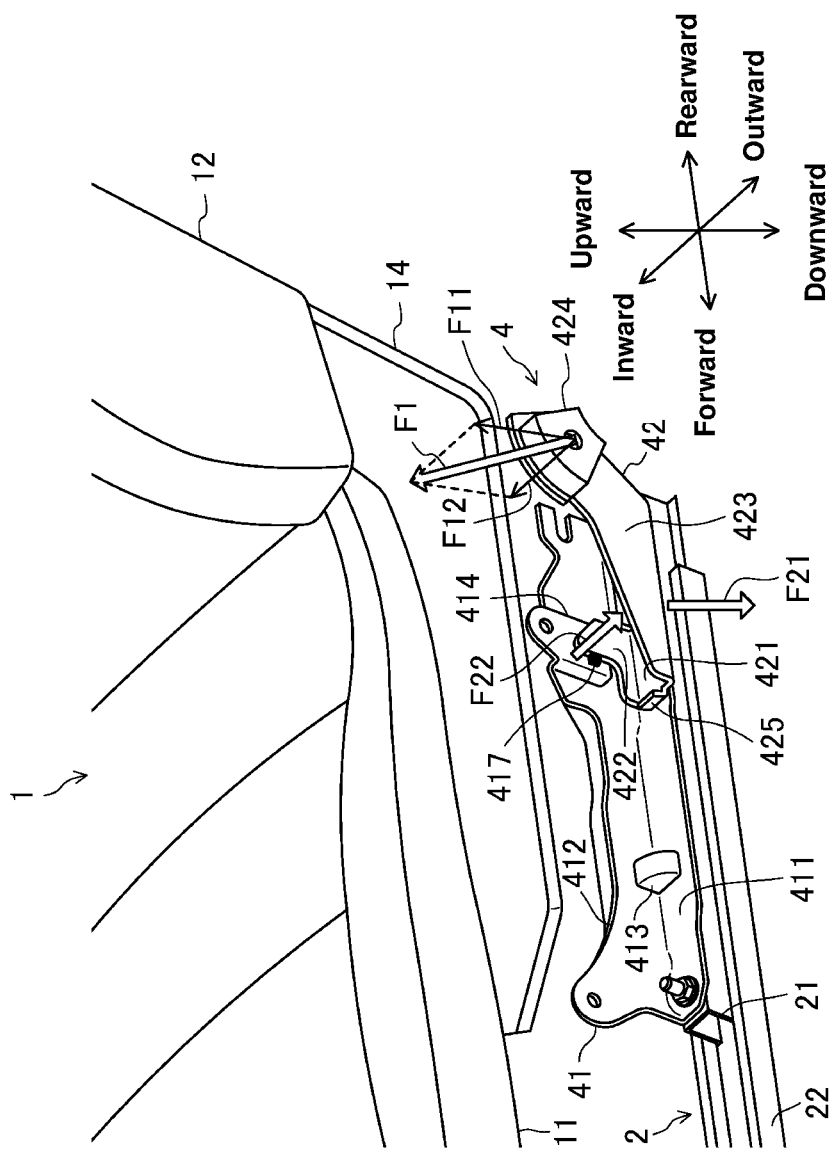
FIG. 2 is a perspective view of an exemplified anchor bracket fixed to an upper rail.
Figure 3:
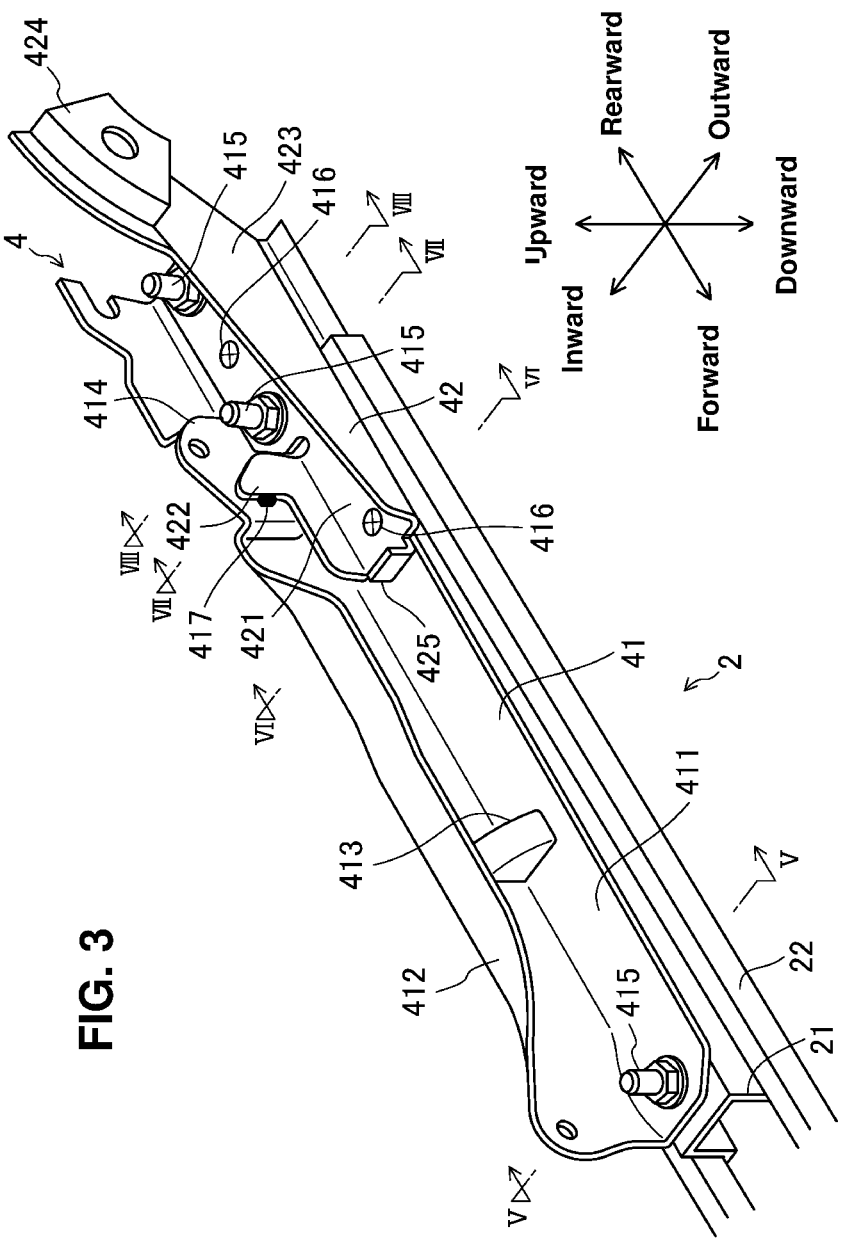
FIG. 3 is a perspective view of an exemplified attachment structure of the anchor bracket.
Figure 4:
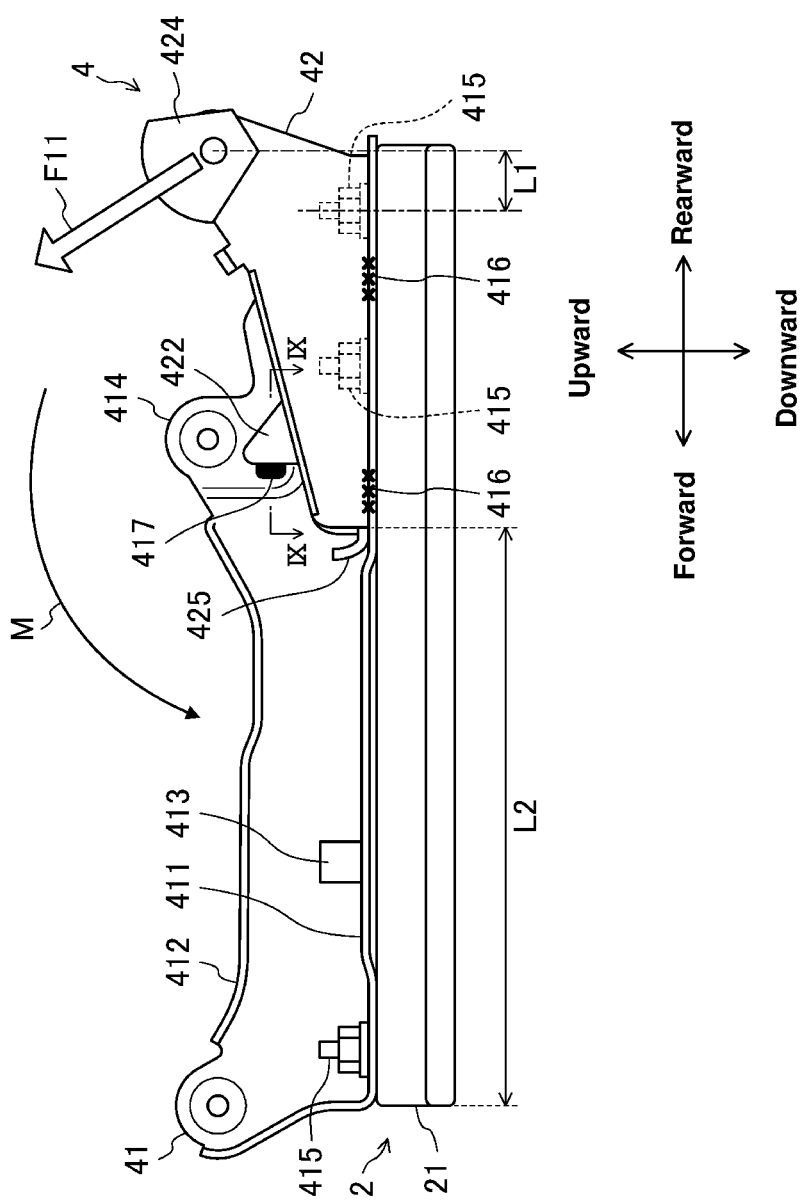
FIG. 4 is a side view of the anchor bracket.

FIGS. 2-4 show an anchor bracket 4 to fix the first anchor 33 to the upper rail 21. The anchor bracket 4 includes a first bracket 41 and a second bracket 42. The first bracket 41 and the second bracket 42 are respectively attached to the upper rail 21.

The first bracket 41 is provided with a first bottom portion 411 and a first side portion 412. The first bracket 41 is formed by pressing.

Figure 5:
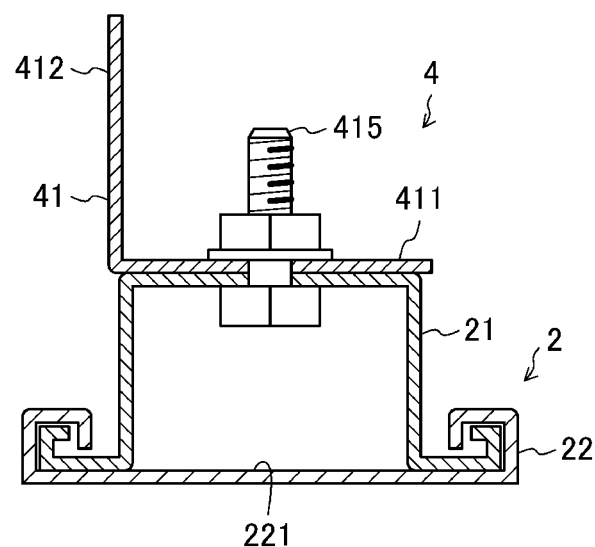
FIG. 5 is a sectional view taken along line V-V of FIG. 3.
Figure 8:
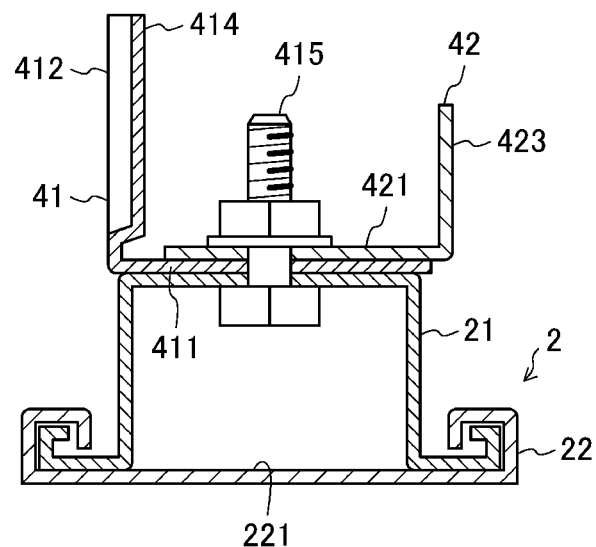
FIG. 8 is a sectional view taken along line VIII-VIII of FIG. 3.

The first bottom portion 411 extends over a range from a front end portion to a rear end portion of the upper rail 21. As shown in FIGS. 5 and 8, the first bottom portion 411 is fixed to the upper rail 21 by using bolts and nuts 415. These bolts and nuts 415 are arranged at two points of the font end portion and the rear end portion of the upper rail 21 as shown in FIGS. 3 and 4. The upper rail 21 is configured to have a hat-shaped cross section. The first bottom portion 411 overlaps on an upper surface of the upper rail 21.

Figure 6:
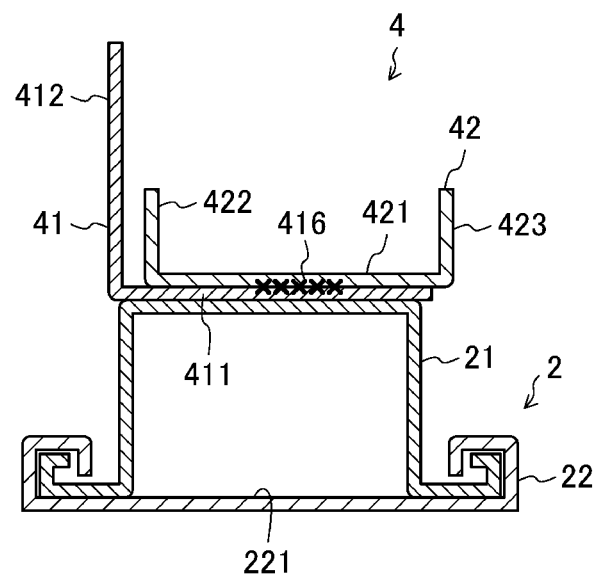
FIG. 6 is a sectional view taken along line VI-VI of FIG. 3.

The first side portion 412 is provided to rise upwardly from an inward edge portion, in the vehicle width direction, of the first bottom portion 411. The first bracket 41 is configured to have an L-shaped cross section as shown in FIGS. 5 and 6. The first side portion 412 extends over the range from the front end portion to the rear end portion of the upper rail 21 as well.

The first bracket 41 includes a rigidity reinforced part 413 which is provided at a middle position, in the longitudinal direction, thereof. The rigidity reinforced part 413 is provided between the first bottom portion 411 and the first side portion 412. This rigidity reinforced part 413 protrudes in a convex shape in a corner of the first bottom portion 411 and the first side portion 412. The rigidity reinforced part 413 increases the rigidity of the first bracket 41.

Figure 7:
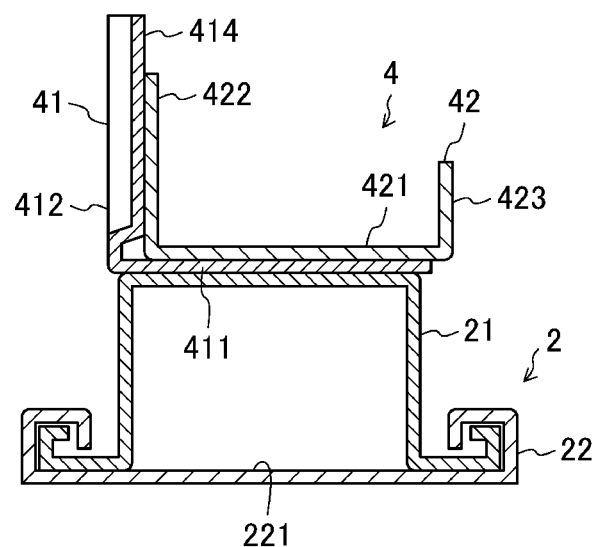
FIG. 7 is a sectional view taken along line VII-VII of FIG. 3.
Figure 9:
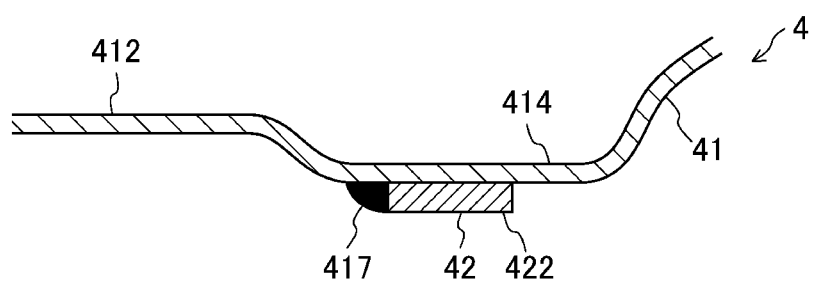
FIG. 9 is a sectional view taken along line IX-IX of FIG. 4.

The first side portion 412 is provided with a joint part 414 where a part of the second bracket 42 is joined. This joint part 414 is provided at a middle position, in the longitudinal direction, of the first side portion 412. The joint part 414 is positioned in back of the rigidity reinforced part 413. The joint part 414 is formed by bending the first side portion 412 so as to protrude outwardly in the vehicle width direction as shown in FIGS. 7 and 8. The joint part 414 is configured to have a hat-shaped cross section as shown in FIG. 9.

The second bracket 42 is attached to the rear end portion of the upper rail 21. The second bracket 42 has a short length in the longitudinal direction. The first bracket 41 has a longer length in the longitudinal direction than the second bracket 42. Since the second bracket 42 is attached to the rear end portion of the upper rail 21, the first bracket 41 extends forwardly beyond the second bracket 42 at the upper surface of the upper rail 21.

The second bracket 42 is provided with a second bottom portion 421, a second side portion 422, and a third side portion 423. The second bracket 42 is formed by pressing.

The second bottom portion 421 overlaps the first bottom portion 411 of the first bracket 41 as shown in FIGS. 6, 7 and 8. The second bottom portion 421 is joined to the first bottom portion 411 by spot welding as shown in FIGS. 3, 4 and 6. The second bottom portion 421 is also fixed to the first bottom portion 411 and the upper rail 21 by using the bolts and nuts 415 as shown in FIGS. 3, 4 and 8. Welding points 416 and the bolts and nuts 415 are alternately arranged in the longitudinal direction.

The second side portion 422 is provided to rise upwardly from an inward edge portion, in the vehicle width direction, of the second bottom portion 421 as shown in FIGS. 3, 6 and 7. The second side portion 422 is positioned at a front part of the second bracket 42. The second side portion 422 overlaps the joint part 414 of the first side portion 412 in the vehicle width direction as shown in FIGS. 7 and 9. More specifically, the first side portion 412 is positioned on the inward side, in the vehicle width direction, of the second side portion 422. To the contrary, the second side portion 422 is positioned on the outward side, in the vehicle width direction, of the first side portion 412. In other words, the first side portion 412 is positioned more closely to the seat 1 than the second side portion 422. Accordingly, the joint part 414 is positioned more closely to the seat 1 than the second side portion 422. As shown in FIG. 9, a side face of the second side portion 422 and a side face of the joint part 414 are joined together by arc welding 417 in a state where these two side faces overlap each other. Herein, the second side portion 422 and the joint part 414 may be joined together by using bolts and nuts.

The third side portion 423 is provided to rise upwardly from an outward edge portion, in the vehicle width direction, of the second bottom portion 421 as shown in FIGS. 3, 6 and 7. The second becket 2 is configured to have a U-shaped cross section which is formed by the second bottom portion 421, the second side portion 422, and the third side portion 423. The third side portion 423 extends over a range from a front end to a rear end of the second bracket 42. The third side portion 423 is formed in a substantially triangular shape, when viewed from the outward side in the vehicle width direction.

The third side portion 423 is provided with an anchor attachment portion 424. The first anchor 33 is attached to the anchor attachment portion 424, which is not illustrated in FIG. 3. The anchor attachment portion 424 is provided at an upper end portion of a rear end of the third side portion 423.

A rigidity reinforced part 425 is provided at a front end portion of the second bracket 42. The rigidity reinforced part 425 is formed by bending a front end part of the second bottom portion 421. The rigidity reinforced part 425 increases the rigidity of the second bracket 42.

When the seatbelt device 3 restrains the occupant, a load F1 which is shown by a white arrow in FIG. 2 is applied to the anchor bracket 4 through the first anchor 33. This load F1 can be divided into an upward load F11 and a load F12 which is directed from the outside of the seat 1 toward the center of the seat 1.

Herein, since the second bracket 42 is fixed to the upper rail 21 via the first bracket 41, the first bracket 41, the second bracket 42, and the upper rail 21 generate a reaction force (resistance) F21 against the upward load F11 (see another white arrow in FIG. 2). Herein, the second bracket 42 has the short length in the longitudinal direction. Thus, the second bracket 42 provides the sufficient resistance against the upward load.

A load F12 in the vehicle width direction which is applied to the anchor attachment portion 424 is transmitted to the first bracket 41 by way of the second side portion 422 of the second bracket 42 and the joint part 414. The first bracket 41 and the upper rail 21 generate a reaction force (resistance) F22 against the load F12 (see further another white arrow in FIG. 2). The first bracket 41 extends over the range from the front end portion to the rear end portion of the upper rail 21. The load transmitted from the second bracket 42 to the first bracket 41 is dispersed. Herein, the first bracket 41 has a long length in the longitudinal direction, and therefore the first bracket 41 can provide the sufficient resistance against the above-described load F12 in the vehicle width direction. Herein, since the longitudinally-long first bracket 41 is provided along the upper rail 21, any interference of the first bracket 41 with other seat structural members is avoided.

Further, since the rigidity of the first bracket 41 is increased by the rigidity reinforced part 413, the first bracket 41 can provide the sufficient resistance against the load F12 in the vehicle width direction.

Moreover, the joint part 414 of the first side portion 412 is positioned more closely to the seat 1 than the second side portion 422. In the occupant restraint, the load directed from the outside of the seat 1 toward the center of the seat 1 is applied to the first anchor 33 through the webbing 31 in the vehicle width direction. Since the first side portion 412 is positioned more closely to the seat 1 than the second side portion 422, the second bracket 42 can transmit the load F12 directed from the outside of the seat 1 toward the center of the seat 1 to the first bracket 41 effectively. The first bracket 41 can effectively generate the reaction force F22 (i.e., provide the sufficient resistance) against the load F12 directed from the outside of the seat 1 toward the center of the seat 1.

Also, the joint part 414 of the first side portion 412 has the hat-shaped cross section, so that the rigidity of this joint part 414 is high. The first bracket 41 can disperse the load in the vehicle width direction which is received from the second bracket 42 at an entire part of the first bracket 41. The first bracket 41 can generate the sufficient reaction force F22 (i.e., the sufficient resistance) against the load F12 in the vehicle width direction.

Further, since the second bracket 42 includes the rigidity reinforced part 425 at its front end part, the rigidity of the second bracket 42 is high. Moreover, the rigidity of the second bracket 42 is increased by its U-shape cross section as well. The second bracket 42 can transmit the load F12 in the vehicle width direction to the first bracket 41 effectively.

As described above, by configuring the anchor bracket 4 to comprise the first bracket 41 which can generate the reaction force (i.e., provide the resistance) F22 against the load F12 in the vehicle width direction primarily and the second bracket 42 which can generate the reaction force (i.e., provide the resistance) F21 against the upward load F11 primarily, the anchor bracket 4 can provide the sufficient resistance against the loads applied to the first anchor 33 even if its size is not so large. Consequently, the restraint performance of the occupant by the seatbelt device 3 can be properly improved without any interference of the anchor bracket 4 with the other seat structural members.

Also, as shown in FIG. 4, a load application (input) position of the anchor attachment portion 424 is spaced apart, in the longitudinal direction, from the welding points 416 and the bolts and nuts 415 for fixing the second bracket 42 by a distance L1. When the load is applied (inputted) to the anchor attachment portion 424, a moment M around an axis extending in the vehicle width direction acts on the first bracket 41 and the second bracket 42 as shown by a solid arrow in FIG. 4. This moment M is a counterclockwise moment in the illustrated example. The first bracket 41 extends forwardly beyond the second bracket 42 (see L2 shown in FIG. 4). The longitudinally-long first bracket 41 can resist the moment M. The first bracket 41 and the second bracket 42 can properly withstand the moment M acting on the anchor bracket 4.

Further, the joint part 414 of the first bracket 41 and the second side portion 422 of the second bracket 42 are joined together by arc welding so as to overlap each other in the vehicle width direction. According to this structure, the load applied to the first bracket 41 from the second bracket 42 is a shearing load. The first bracket 41 and the second bracket 42 which are joined together at their side faces show enhanced resistance against the shearing load. Accordingly, the anchor bracket 4 can provide the high load-resistance performance.

Moreover, since the first bracket 41 and the second bracket 42 are different (separated) members from each other, the plate thickness of the first bracket 41 and the plate thickness of the second bracket 42 can be differentiated. The load applied to the first anchor 33 is directly inputted to the second bracket 42, so that the second bracket 42 can resist the larger load by increasing the plate thickness of the second bracket 42. Meanwhile, it is unnecessary that the plate thickness of the first bracket 41 is made to be equal to that of the second bracket. The plate thickness of the first bracket 41 may be made thinner than that of the second bracket 42. The weight of the anchor bracket 4 is reduced by making the plate thickness of the first bracket 41 thinner. The anchor bracket 4 comprising the first bracket 41 and the second bracket 42 improves the load resistance performance without the weight increase.

As shown in FIGS. 6-8, the second bracket 42 is provided to protrude outwardly, in the vehicle width direction, beyond the upper rail 21. In the figures, the second bracket 42 is illustrated so as to protrude to the right on each page. Since the second bracket 42 protrudes beyond the upper rail 21, this protrusion portion is configured in a cantilever state. In general, when the load is applied to a bracket configured in the cantilever state, it is likely that this bracket is deformed. Meanwhile, the anchor bracket 4 comprising the first bracket 41 and the second bracket 42 can receive the load by corporation of the first bracket 41 and the second bracket 42 even when the load from the first anchor 33 is applied to the second bracket 42 configured in the cantilever state.

Herein, the arrangement position of the seat rail 2 is decided based on a vehicle-body structure, and the size of the anchor bracket 4 is decided by a magnitude of the load inputted and a shape and/or structure of the seat 1. Accordingly, there is a case where the second bracket 42 protrudes outwardly, in the vehicle width direction, beyond the upper rail 21 (i.e., protrudes to the outside of the seat 1). In this case, the anchor bracket 4 of this embodiment can receive the load properly. That is, the anchor bracket 4 of the present structure increases the flexibility of the arrangement position of the seat rail 2 and the size of the anchor bracket 4.

Herein, the anchor bracket to fix the buckle 35 to the upper rail 21 may be configured to have the same structure as the anchor bracket 4, which is not illustrated. That is, the anchor bracket described here may be the bracket to fix the buckle to the rail.

Additionally, the seat structure for the vehicle described here is not limited to application to the front seat. The seat structure for the vehicle described here is widely applicable to any seat comprising the seat rail to slide the seat in the longitudinal direction.

What is claimed is:

1. A seat structure for a vehicle, comprising:
a seat where an occupant is seated;
a seat rail fixed to a vehicle body, the seat rail comprising a lower rail including a groove portion extending in a vehicle longitudinal direction and an upper rail provided to be slid in the groove portion of the lower rail and guided by the lower rail; and
an anchor bracket fixing an anchor of a seatbelt device for restraining the occupant to the upper rail of the seat rail,
wherein said anchor bracket includes a first bracket provided with a first bottom portion fixed to said upper rail and a first side portion rising upwardly from said first bottom portion and a second bracket provided with a second bottom portion fixed to said upper rail, a second side portion rising upwardly from said second bottom portion, and an anchor attachment portion where said anchor is attached,
said first side portion of the first bracket and said second side portion of the second bracket are connected to each other and positioned such that a line extending in a vehicle width direction intersects both said first side portion of the first bracket and said second side portion of the second bracket, and
said first bracket is provided to extend forwardly beyond said second bracket at an upper surface of said upper rail of the seat rail.

2. The seat structure for the vehicle of claim 1, wherein said first bracket is longer than said second bracket in the vehicle longitudinal direction.

3. The seat structure for the vehicle of claim 1, wherein said first side portion of the first bracket is positioned more closely to said seat than said second side portion of the second bracket.

4. The seat structure for the vehicle of claim 1, wherein a joint part of said first side portion of the first bracket to said second side portion of the second bracket is configured to have a hat-shaped cross section.

5. The seat structure for the vehicle of claim 1, wherein said second bracket includes a rigidity reinforced part which is provided at a front end part of said second bottom portion.

6. The seat structure for the vehicle of claim 1, wherein said second bracket is provided with a third side portion which is provided to rise upwardly from said second bottom portion and faces said second side portion, and said anchor attachment portion is provided at said third side portion.

7. The seat structure for the vehicle of claim 1, wherein said first bracket is provided to extend over a range from a front end portion and a rear end portion of said upper rail of the seat rail.

8. The seat structure for the vehicle of claim 7, wherein said second bottom portion of the second bracket is fixed to said upper rail of the seat rail in a state where the second bottom portion overlaps on said first bottom portion of the first bracket.

9. The seat structure for the vehicle of claim 1, wherein said second bracket fixed to the upper rail is provided to protrude outwardly, in the vehicle width direction, beyond the upper rail.

10. A seat structure for a vehicle, comprising:
a seat where an occupant is seated;
a seat rail fixed to a vehicle body, the seat rail comprising a lower rail including a groove portion extending in a vehicle longitudinal direction and an upper rail provided to be slid in the groove portion of the lower rail and guided by the lower rail; and
an anchor bracket fixing an anchor of a seatbelt device for restraining the occupant to the upper rail of the seat rail,
wherein said anchor bracket includes a first bracket and a second bracket,
said first bracket is provided with a first bottom portion fixed to said upper rail and a first side portion rising upwardly from said first bottom portion,
said second bracket is provided with a second bottom portion fixed to said upper rail, a second side portion rising upwardly from said second bottom portion, and an anchor attachment portion where said anchor is attached,
said first bracket is longer than said second bracket in the vehicle longitudinal direction,
said first bracket is provided to extend forwardly beyond said second bracket at an upper surface of said upper rail of the seat rail and extend over a range from a front end portion and a rear end portion of said upper rail of the seat rail, said second bracket fixed to the upper rail is provided to protrude outwardly, in the vehicle width direction, beyond the upper rail, said first side portion of the first bracket and said second side portion of the second bracket are connected to each other and positioned such that a line extending in a vehicle width direction intersects both said first side portion of the first bracket and said second side portion of the second bracket, said first side portion of the first bracket is positioned more closely to said seat than said second side portion of the second bracket, a joint part of said first side portion of the first bracket to said second side portion of the second bracket is configured to have a hat-shaped cross section, said second bracket includes a rigidity reinforced part which is provided at a front end part of said second bottom portion, said second bracket is provided with a third side portion which is provided to rise upwardly from said second bottom portion and faces said second side portion, and said anchor attachment portion is provided at said third side portion, and said second bottom portion of the second bracket is fixed to said upper rail of the seat rail in a state where the second bottom portion overlaps on said first bottom portion of the first bracket.

11. A seat structure for a vehicle, comprising:

a seat where an occupant is seated;

a seat rail fixed to a vehicle body, the seat rail comprising a lower rail including a groove portion extending in a vehicle longitudinal direction and an upper rail provided to be slid in the groove portion of the lower rail and guided by the lower rail; and an anchor bracket fixing an anchor of a seatbelt device for restraining the occupant to the upper rail of the seat rail, wherein said anchor bracket includes a first bracket provided with a first bottom portion fixed to said upper rail and a first side portion rising upwardly from said first bottom portion and a second bracket provided with a second bottom portion fixed to said upper rail, a second side portion rising upwardly from said second bottom portion, and an anchor attachment portion where said anchor is attached, said first side portion of the first bracket and said second side portion of the second bracket are connected to each other and positioned such that a line extending in a vehicle width direction intersects both said first side portion of the first bracket and said second side portion of the second bracket, said first bracket is provided to extend forwardly beyond said second bracket at an upper surface of said upper rail of the seat rail, said second bracket includes a rigidity reinforced part which is provided at a front end part of said second bottom portion, and said second bracket fixed to the upper rail is provided to protrude outwardly, in the vehicle width direction, beyond the upper rail.

* * * * *